(12) United States Patent
Olin et al.

(10) Patent No.: US 6,452,307 B1
(45) Date of Patent: Sep. 17, 2002

(54) DEVICE FOR MICROPOSITIONING OF AN OBJECT

(75) Inventors: Hakan Olin, Göteborg; Kristian Gustavsson, Västra Frölunda; Per Gralvik, Karlskrona, all of (SE)

(73) Assignee: Nanofactory Instruments AB, Göborg (SE)

( * ) Notice: Subject to any disclaimer, the term of this patent is extended or adjusted under 35 U.S.C. 154(b) by 0 days.

(21) Appl. No.: 09/980,688
(22) PCT Filed: Jun. 13, 2000
(86) PCT No.: PCT/SE00/01223
§ 371 (c)(1),
(2), (4) Date: Jan. 11, 2002
(87) PCT Pub. No.: WO00/77553
PCT Pub. Date: Dec. 21, 2000

(30) Foreign Application Priority Data

Jun. 13, 1999 (SE) .............................. 9902244
Dec. 9, 1999 (SE) .............................. 9904490

(51) Int. Cl.$^7$ ................................ H02N 2/00
(52) U.S. Cl. .................. 310/323.17; 310/328; 310/369
(58) Field of Search ........................... 310/323.17, 328, 310/369

(56) References Cited

U.S. PATENT DOCUMENTS

| 4,714,855 A | * | 12/1987 | Fujimoto | 310/328 |
| 5,237,238 A | | 8/1993 | Berghaus et al. | 310/328 |
| 5,306,919 A | | 4/1994 | Elings et al. | 250/442.11 |
| 5,568,004 A | | 10/1996 | Kleindiek | 310/328 |
| 5,901,997 A | * | 5/1999 | Bayer | 118/423 |
| 5,947,594 A | * | 9/1999 | Dolatli et al. | 366/110 |
| 6,107,791 A | * | 8/2000 | Lee | 324/72.5 |
| 2002/0014813 A1 | * | 2/2002 | Moler et al. | 310/328 |

OTHER PUBLICATIONS

A. Ferreira et al., "New Multi–Degree of Freedom Piezo-electric Micromotors for Micromanipulator for Micropositioning Applications," Ultrasonics Symposium, (1995) pp. 417–422, vol. 1 6/95.

Ryu Jae–Chun et al., "Force Control of Micro Robotic Finger Using Fuzzy Controller," Annual cobnference, 1996, International Session Papers. Sice '96 Proceedings of the 35$^{th}$ (1996) pp. 1395–1400 (Abstract) 7/96.

* cited by examiner

Primary Examiner—Thomas M. Dougherty
(74) Attorney, Agent, or Firm—Burns, Doane, Swecker & Mathis LLP

(57) ABSTRACT

The invention relates to a device for micropositioning of objects, for example, in microscopy. The device comprises an accelerating means and a positioning unit connected therewith and connected with the object. The position of the object relative to the positioning unit can be changed at high acceleration or retardation of the accelerating means owing to mechanical inertia of the object. The positioning unit comprises at least two clamping elements between which the object is intended to be held merely by the clamping force and the frictional force exerted by these clamping elements.

20 Claims, 1 Drawing Sheet

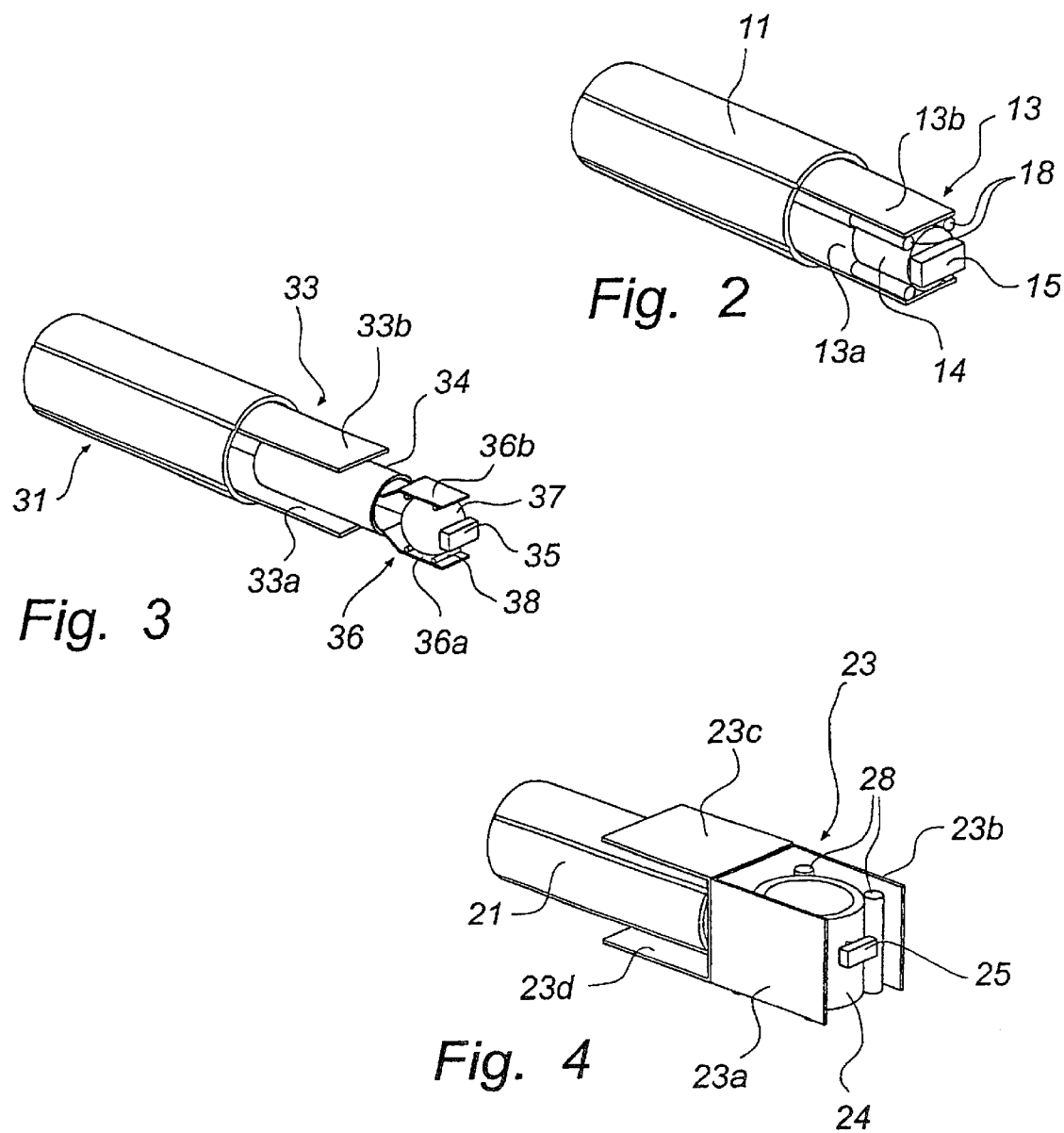

DEVICE FOR MICROPOSITIONING OF AN OBJECT

FIELD OF THE INVENTION

This invention relates to a device for micropositioning of objects, for instance in microscopy. The device comprises an accelerating means and a positioning unit connected with the accelerating means and in turn connected with the object. Moreover the position of the object relative to the positioning unit is variable at high acceleration or retardation of the accelerating means, owing to mechanical inertia of the object.

BACKGROUND ART

In many fields there is a need for positioning of objects with great accuracy. This is most important, for example in a scanning probe microscope, SPM, in which a sample must be moved towards the probe before starting a scanning. A technique of carrying out such moving involves an inertia-type motor, according to the above description, in which excitation of a piezotube causes an extension of the same and a corresponding movement of an object connected therewith, whereupon the piezotube is very rapidly retracted as the excitation ceases, and owing to moment of inertia in the system, the object that is to be moved then stays in the position where it was located when the piezotube was in its excited position. A device of the above type is described in, for example, K. Svensson, F. Althoof and H. Olin, "A compact inertial slider STM", Meas. Sci. Techn., 8, 1360–1362 (1997). This publication describes a device for micropositioning in a scanning tunnel microscope, comprising both a sample and a sharp scanning tip. The position of the sharp scanning tip relative to the sample is controlled by means of two concentric piezoelectric tubes, the inner tube being used for scanning of the prod and the outer tube being used for inertia movement of the sample. The construction also comprises a positioning unit including two parts, a first part which is fixedly connected to the outer tube and a second part which holds the sample. The second part is slidingly arranged on the first part, the sliding surface being located in a plane which is not perpendicular to the sharp scanning tip. When applying, for example, a serrated wave-shape to the piezoelectric element, displacements between these two parts occur as the acceleration exceeds the limit of the static friction between the parts. The two parts are arranged in such manner that, when sliding towards each other in said sliding surface, the sample arranged on the second part is moved so as to be closer or further away from the prod while at the same time the actual sample surface is continuously held perpendicular to the prod. This construction is very compact and has a number of desirable properties, such as a low noise level. However the construction is complicated and comprises two piezoelectric elements. A micro-positioning device of a simpler design is therefore desirable, which has a short mechanical loop, to reduce the mechanical noise in the form of vibrations in the system. A simpler design of the system further contributes to reducing the risk that dirt and other external interference reduces or fully eliminates the function of the inertia-type motor. Furthermore the above prior-art construction is particularly adapted to scanning tunnel microscopy (STM), and a more general device for use in connection with e.g. scanning probe microscopy (SPM) and other applications is desirable.

OBJECT OF THE INVENTION

The object of the invention thus is to provide a micropositioning device which is of a simple design and which is adaptable for use within a plurality of applications, such as in scanning probe microscopy.

SUMMARY OF THE INVENTION

According to the invention this and other objects are achieved by the positioning unit, included in the device, comprising at least two clamping elements, between which the object is adapted to be held merely by means of the clamping force and the frictional force exerted by said clamping elements. Consequently, the object is movable relative to the clamping elements by mechanical inertia when the acceleration/retardation force obtained for the clamping elements from the accelerating means connected thereto exceeds said clamping and frictional forces between the object and the clamping element.

The clamping elements conveniently comprise resilient tongues which are directly connected with the accelerating means and are oriented in the longitudinal direction of the accelerating means and between which the object is arranged. This allows a simple construction and easy attachment of the object between the resilient tongues.

According to a preferred embodiment, said object is spherical, which, in cooperation with suitably arranged accelerating means, by means of separate acceleration/retardation control of each clamping element, not only allows movement of the object away from and towards the accelerating means (in the z direction), but also rotation of the spherical object in two directions (up and down, as well as laterally relative to the clamping elements).

According to another embodiment, the object is cylindrical, which allows increased mechanical stability. The term "cylinder" is here to be interpreted in its mathematical definition, i.e. a body defined by a surface which is obtained by parallel displacement of a straight line along a closed curve.

According to an embodiment, the longitudinal direction of said cylindrical object is essentially parallel to the longitudinal direction of the accelerating means, i.e. the cylinder is moved in its longitudinal direction when moving the object away from or towards the accelerating means. This causes a stable motion in the z direction owing to a comparatively large abutment surface between the cylinder and the clamping elements.

Suitably said cylinders are essentially circular in cross-section, which allows simple, angle-independent positioning of the cylinder between the clamping elements.

According to one more alternative embodiment, said positioning unit comprises two U-shaped means with legs of a sheet-like material, which are joined in such manner that their respective open ends are oriented in opposite directions, the legs of the first U-shaped means constituting said clamping element for forming a sliding surface against said object, and the legs of the second U-shaped means constituting sliding surfaces intended for direct abutment and high-friction-sliding against the accelerating means. This construction allows easy exchange of the positioning unit, for example in case of wear on the resilient elements or the sliding surfaces. Moreover, if necessary, various positioning units can be used with the same piezoelectric element. The object in this embodiment is suitably cylindrical and circular in cross-section and its longitudinal axis is essentially perpendicular to the longitudinal direction of the accelerating means. This allows stable attachment in the longitudinal direction of the object, between the resilient elements of the first U-shaped means and the circumferential surface of the cylindrical object, and also in the z direction, between the resilient elements of the second U-shaped means and the circumferential surface of the piezotube, in both cases owing to a larger abutment surface than in the spherical case. Said sliding surfaces preferably comprise sliding elements, preferably graphite rods, which are arranged on the leg surface and directed towards the object and the accelerating means, respectively. These rods allow, in addition to excellent sliding quality, also guiding of the object in the desired direction.

Preferably the accelerating means further comprises a tube of piezoelectric material, which provides a simple and well-tested mechanism for obtaining said rapid acceleration and retardation motions.

According to one more preferred embodiment, the clamping elements are arranged inside the tube of piezoelectric material, which allows a very compact and space-efficient construction.

Finally a sample holder is suitably arranged on the object, on the side which is essentially directed away from the accelerating means. This allows the sample holder to be formed separately from the object and thus to have a shape suitable for the sample, independently of the shape of the object. This allows on the other hand that the object can be designed for ideal possibilities of adjustment.

BRIEF DESCRIPTION OF THE DRAWINGS

The invention will now be described in more detail with reference to the preferred embodiments which are illustrated in the accompanying drawing.

FIG. 1 is a schematic perspective view of a first embodiment of the invention for micropositioning of a spherical object.

FIG. 2 is a schematic perspective view of a second embodiment of the invention for micropositioning of a cylindrical object.

FIG. 3 is a perspective view of a third embodiment of the invention, in which micropositioning is effected by means of two cooperating objects, one spherical and one cylindrical.

FIG. 4 is a perspective view of a fourth embodiment for micropositioning of a cylindrical object.

DESCRIPTION OF PREFERRED EMBODIMENTS

The embodiment of the invention as shown in FIG. 1 comprises a tube 1 of a piezoelectric material, which constitutes an accelerating means. The outer circumferential surface of the tube 1 is divided into four electrically separated segments 1a–1d (1d not shown), which extend in the longitudinal direction of the tube 1 and each hold an angle segment of the circumferential surface of the tube 1 corresponding to 25% of the total extent. Each segment is, with the aid of electric connecting means 2, connected to a wave generator, and the segments 1a, 1b, 1c and 1d can be controlled independently of each other. At one opening of the piezoelectric tube, two resilient tongues 3a, 3b are arranged and project from the piezotube 1 in the longitudinal direction of the piezotube 1. The tongues 3a, 3b are arranged on opposite sides of the opening of the tube 1 and are fixedly connected with the inside of the tube 1. A spherical object 4 is arranged between said resilient elements 3a, 3b. The object 4 is only attached by clamping action and friction, and the object is freely movable under the action of forces, i.e. it is displaceable towards and away from the piezoelectric tube 1 and rotatable in all directions.

Furthermore a sample holder 5 is arranged on the spherical object 4, on the side of the object 4 which is directed away from the piezoelectric tube 1. The sample holder 5 can be of different designs and is not crucial to the invention and will therefore not be described in more detail.

In operation, segments of the piezoelectric element are supplied with an electric wave, suitably a cycloid-like electric wave since this merely produces high acceleration in one direction, but also serrated waves and other types of electric waves are usable. The waveform of the operating voltage which excites the piezotube is modulatable to provide the desired movement of the object 5. Other suitable modulating parameters are amplitude and frequency. According to the desired motion of the piezotube 1, all segments 1a–1d can be supplied with identical waves for providing a uniform extension of the piezotube 1, or be supplied with different waves for providing a bending motion of the piezotube 1, or more concrete an extension of one side of the tube while the length of the other side of the tube is unchanged. When moving the sample in the z direction, from the piezoelectric tube, first an extension of the element occurs, followed by a return to the initial length. By making this change in such manner that the piezotube rapidly changes from a relatively high extension speed to a relatively high return speed, i.e. making the change from extension to return so rapid that the accelerating force temporarily exceeds the combined frictional force and resilience between the object and the resilient tongues, a movement of the object relative to the tongues occurs owing to a mechanical moment of inertia of the object. By using a cycloidal pulse an opposite motion of the object is besides prevented in the change between return and extension of the piezotube since the total acceleration is then much lower. By supplying the piezoelectric element with an inverted cycloidal wave, an opposite motion is achieved, i.e. a motion of the object towards the piezoelectric tube. To provide a turning of the object relative to the resilient tongues 3a, 3b, a segment, on which a resilient element 3a is arranged, for example 1a, is supplied with a corresponding cycloidal wave whereas the remaining segments are left unexcited. Thus, an extension of one side of the piezotube relative to the other side occurs, which results in said bending of the piezotube.

When returning to the unexcited position, the accelerating force will exceed the frictional force and the clamping force merely on one side of the object 5, in this case between the object 5 and the resilient tongue 3a, which results in turning of the objects 5 relative to the tongues 3a, 3b in the return motion. To cause a turning of the object in a plane which is essentially parallel with the planes that are defined by the extent of the resilient tongues 3a, 3b, a segment, on which no tongue is arranged, for example 1b, is excited, while the other segments are left unexcited. In excitation, the object will thus obtain an angular displacement relative to the unexcited longitudinal axis of the piezotube, the angular displacement, owing to mechanical inertia in the system, remaining when quickly returning to the initial position. The object in this embodiment thus is movable and controllable in three dimensions.

The embodiment illustrated in FIG. 2 is identical with the embodiment shown in FIG. 1 except that the spherical object 4 is replaced by a cylindrical object 14. This results in better stability for motion in the z direction (the longitudinal direction of the piezotube), owing to a larger abutment surface between the resilient tongues 13a, 13b and the object 15, but at the same time causes the object to be limited to move in one dimension. In order to facilitate this motion, sliding elements, in this embodiment graphite rods 18, can be arranged in pairs on the two opposite sides of the resilient elements 13a, 13b, between which rods the cylindrical object 14 is slidingly arranged. This allows improved and more stable frictional properties. Corresponding elements can also be arranged in the construction as shown in FIG. 1.

FIG. 3 shows an embodiment which is a combination of the constructions shown in FIGS. 1 and 2. A cylindrical object 34 is slidingly arranged between two resilient tongues 33a, 33b which are fixedly connected with a piezoelectric tube 31. On the short side of the cylindrical object 34 facing away from the piezotube 31, two more tongues 36a, 36b are arranged, between which a spherical body 37 is arranged. A sample holder 35 is in turn arranged on the spherical object 37 like in FIG. 1. The spherical object 37 is prevented by sliding rods 38 from being displaced in the z direction relative to the tongues. In this embodiment, the three-dimensional motion is thus divided into two steps, the z motion occurring by means of the cylindrical object 34 in the same way as in the embodiment shown in FIG. 2, and motion in the other two directions occurring by rotation of the spherical object 37 in accordance with the description of the embodiment shown in FIG. 1.

The embodiment illustrated in FIG. 4 has a basic design which is somewhat different from the embodiments shown in FIGS. 1–3, but bears great resemblance in respect of function to the other embodiments. In this embodiment, the positioning unit comprises two U-shaped metal sheets which are joined together in the web, in such manner that their respective open ends, which are defined by the respective pairs of legs 23c, 23d and 23a, 23b, respectively, are oriented in opposite directions. The legs form resilient tongues. In this embodiment, the two U-shaped metal sheets are also joined in such manner that the first pair of legs 23a, 23b is turned through 90 degrees relative to the second pair of legs 23c, 23d. The legs in the second pair of legs 23c, 23d are adapted to form resilient tongues which are intended to be slidingly arranged directly against the outside of the piezotube 1, to make it possible for the device to move in the z direction. Between the legs in the first pair of legs 23a, 23b, a cylindrical object 24 is slidingly arranged, whose longitudinal axis essentially forms an angle of 90 degrees relative to the unexcited longitudinal axis of the piezotube 21. The cylindrical object 24 is thus displaceable relative to the legs 23a, 23b along the longitudinal axis of the object and rotatable about the same axis, in a suitable motion of the piezotube, in the manner as described above in connection with the other embodiments. On the circumferential surface of the cylindrical object 24 on the side directed away from the piezotube, a sample holder 25 is arranged in the same way as in the embodiment illustrated in FIG. 1. Also in this embodiment, just like in the embodiment shown in FIG. 3, the movability of the object is divided into two parts, one part providing for motion in the z direction, and one part providing for motion in the other directions. Also in this embodiment, sliding elements 28 are arranged to facilitate displacement of the object.

The above embodiments are only stated for exemplification and are not intended to limit the scope of invention. A number of modifications and constructional changes which are obvious to those skilled in the art can, of course, be made without departing from the basic inventive idea as defined in claim 1. For instance, it can be mentioned that sliding elements of the type discussed in connection with FIG. 2, such as graphite rods, but also other types, can, of course, be arranged in all sliding surfaces to facilitate and control the frictional effect in said sliding surfaces. Furthermore, a number of mutually cooperating spherical and cylindrical bodies can be arranged for more exact guiding in certain directions. The embodiment in FIG. 3 is merely an example of such a combination. Moreover, the piezotube, which is used in the embodiments described above, can be replaced by, for example, a stepping motor, or an optional element which can cause sufficiently high acceleration of the positioning unit. The positioning unit can be attached to the inside or the outside of the piezotube, like in FIG. 1, but can also be slidingly arranged on the piezotube like in FIG. 4. The number of clamping elements or resilient tongues is not limited to two, but can be two or more.

Nor is the shape of the object essential for the invention, even if a number of preferred shapes have been described above. For instance, the cylinder in FIG. 2a can have the form of a rectangular parallelepiped. Although all clamping elements described above are of a resilient type, it is possible to use a number of spaced-apart non-resilient elements, between which the object is arranged.

What is claimed is:

1. A device for micropositioning of objects (4; 14; 24; 34), e.g. in microscopy, said devise comprising an accelerating means (1; 11; 21; 31) and a positioning unit (3; 13; 23; 33) which is connected with the accelerating means and which in turn is connected with the object (4; 14; 24; 34), the position of the object relative to the positioning unit (3; 13; 23; 33) being variable at high acceleration or retardation of the accelerating means (1; 11; 21; 31) owing to mechanical inertia of the object (4; 14; 24; 34), characterised in that said positioning unit (3; 13; 23; 33) comprises at least two clamping elements (3a, 3b; 13a, 13b; 23a, 23b; 33a, 33b), between which the object is intended to be held merely by the clamping force and the frictional force exerted by said clamping elements.

2. A device as claimed in claim 1, characterised in that the clamping elements (3a, 3b; 13a, 13b; 23a, 23b; 33a, 33b) comprise resilient tongues which are directly connected with the accelerating means (1; 11; 21; 31) and are oriented in the longitudinal direction thereof and between which the object (4, 14, 24, 34) is arranged.

3. A device as claimed in claim 1, characterised in that said object (4, 14, 24, 34) is essentially spherical.

4. A device as claimed in claim 1, characterised in that said object (4, 14, 24, 34) is essentially cylindrical.

5. A device as claimed in claim 4, characterised in that the longitudinal axis of said cylindrical object (4, 14, 24, 34) is essentially parallel to the longitudinal direction of the accelerating means (1, 11, 21, 31).

6. A device as claimed in claim 4, characterised in that the cylindrical object (4, 14, 24, 34) is essentially circular in cross-section.

7. A device as claimed in claim 1, characterised in that the positioning unit (23) comprises two U-shaped means, with legs (23a, 23b; 23c, 23d) of a sheet-like material, said means being joined in such manner that their respective open ends are oriented in opposite directions, the legs (23a, 23b) of the first U-shaped means constituting said clamping elements to form a sliding surface against said object (24), and the legs (23c, 23d) of the second U-shaped object constituting sliding surfaces intended for direct abutment and high friction sliding against the accelerating means (21).

8. A device as claimed in claim 7, characterised in that the object (24) is cylindrical and circular in cross-section, and that the longitudinal axis of said cylindrical object (24) is essentially perpendicular to the longitudinal direction of the accelerating means (21).

9. A device as claimed in claim 7, characterised in that said sliding surfaces comprise sliding rods (18, 28, 38), preferably made of graphite, directed towards the object (24) and the accelerating means (21), respectively, and attached to the leg surface.

10. A device as claimed in claim 1, characterised in that the accelerating means (1; 11; 21; 31) comprises a tube of piezoelectric material.

11. A device as claimed in claim 10, characterised in that the clamping elements (3a, 3b; 13a, 13b; 23a, 23b; 33a, 33b) are arranged inside the tube of piezoelectric material.

12. A device as claimed claim 1, characterised in that a sample holder (5; 15; 25; 35) is arranged on the object (4, 14, 24, 34), said sample holder being arranged on that side of the object which is essentially directed away from the accelerating means (1; 11; 21; 31).

13. A device as claimed in claim 2, characterised in that said object (4, 14, 24, 34) is essentially spherical.

14. A device as claimed in claim 2, characterised in that said object (4, 14, 24, 34) is essentially cylindrical.

15. A device as claimed in claim 5, characterised in that the cylindrical object (4, 14, 24, 34) is essentially circular in cross-section.

16. A device as claimed in claim 14, characterised in that the cylindrical object (4, 14, 24, 34) is essentially circular in cross-section.

17. A device as claimed in claim 8, characterised in that said sliding surfaces comprise sliding rods (18, 28, 38), preferably made of graphite, directed towards the object (24) and the accelerating means (21), respectively, and attached to the leg surface.

18. A device as claimed in claim 2, characterised in that the accelerating means (1; 11; 21; 31) comprises a tube of piezoelectric material.

19. A device as claimed in claim 3, characterised in that the accelerating means (1; 11; 21; 31) comprises a tube of piezoelectric material.

20. A device as claimed claim 2, characterised in that a sample holder (5; 15; 25; 35) is arranged on the object (4, 14, 24, 34), said sample holder being arranged on that side of the object which is essentially directed away from the accelerating means (1; 11; 21; 31).

* * * * *